SAMPLE AND HOLD CIRCUIT

Filed Dec. 23, 1964 2 Sheets-Sheet 1

INVENTOR.
F. MANSFIELD YOUNG
BY Conway, Jenney & Hildreth
ATTORNEYS

INVENTOR.
F. MANSFIELD YOUNG
BY Kenway, Jenney & Hildreth
ATTORNEYS

United States Patent Office 3,392,345

Patented July 9, 1968

3,392,345

SAMPLE AND HOLD CIRCUIT

Frink Mansfield Young, Boston, Mass., assignor to Adage, Inc., Cambridge, Mass., a corporation of Massachusetts Filed Dec. 23, 1964, Ser. No. 420,499
7 Claims. (Cl. 330—51)

ABSTRACT OF THE DISCLOSURE

An improved sample and hold circuit having a first and second amplifier, and a degenerative feedback path provided around both amplifiers. A holding capacitor is connected between the input and output terminals of the second amplifier. A switch is provided which is in parallel with the output terminals of the first amplifier and means including at least one diode connects the output terminal of the first amplifier to the input terminal of the second amplifier. In the "tracking" or "sample" mode the switch is opened and the output signal of the first amplifier is supplied as an input signal to the second amplifier through the diode or diodes. The first amplifier provides current to charge the capacitor included in the feedback path of the second amplifier.

In the "hold" mode the switch is closed connecting the diode across the input terminals of the output amplifier. If the switch is not perfect, leakage current through the switch may generate a few millivolts across it. However, this is generally not sufficient to cause diode conduction and the diode remains in the high impedance region of its characteristic, thereby limiting leakage current from the holding capacitor. In this manner a parallel switch with its attendant advantages may be used in place of a series switch to transfer between the sample and hold modes of operation.

My invention relates to an improved sample and hold circuit for use in the processing of analog electrical signals. More particularly it relates to a sample and hold circuit capable of following rapid signal changes, having a relatively long holding period and which provides reduced distortion of the signal to be processed as compared with prior circuits of this type.

In the processing of analog electrical signals it is often desirable when making a measurement by converting the signal to a corresponding digital number to make the measurement at a precisely determined time and to hold the signal value occurring at the time for the period required to make the conversion to a digital representation. Sample and hold circuits have been developed for this purpose. Sample and hold circuits are also used when it is desired to measure two or more values of an analog signal simultaneously. Then the signals are each fed to a sample and hold circuit and at the time the measurement is desired, the circuits are switched from the "sample" or "tracking" mode to the "hold" mode of operation and they thereafter hold the signal values at the time of switching until the desired measurements can be made.

Obviously, for use in measurement applications, it is desirable that the sample and hold circuit have an output which faithfully follows changes in the input signal, no matter how rapidly these changes may take place. Further such circuits should switch to the "hold" mode rapidly when commanded to do so and should hold the output signal at the value it had at the time of the "hold" command long enough so that the associated measuring apparatus will have ample time to perform the desired measurements. Further, the sample and hold circuit should not itself change or affect the signal value between input and output i.e. faithful reproduction of the value of the analog input signal is desired at the output terminals of the circuit (except, of course, that the signal may be multiplied by a known, fixed gain). Known sample and hold circuits suffer from various deficiencies in these desired characteristics and the known circuits and the problems associated with them as well as my improved circuit will be discussed in greater detail hereinafter.

It is a principal object of my invention to provide an improved sample and hold circuit of the type described.

Another object of my invention is to provide a sample and hold circuit which accurately reproduces the value of the signal appearing at its input terminals at the time the circuit is switched from the "track" to the "hold" mode.

A further object of my invention is to provide a sample and hold circuit which will "track" rapidly changing input signals more faithfully than prior circuits of this type.

A still further object of my invention is to provide a sample and hold circuit in which the characteristics of the switches which operate to change from the "track" to the "hold" mode of operation do not affect the output signal.

Yet a further object of my invention is to provide a sample and hold circuit which may be constructed using conventional components of lower cost than prior circuits.

Other and further objects of my invention will in part be obvious and will in part appear below.

The invention accordingly comprises the features of construction, combination of elements, and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawing in which.

*Prior sample and hold circuits*

Figure 1:
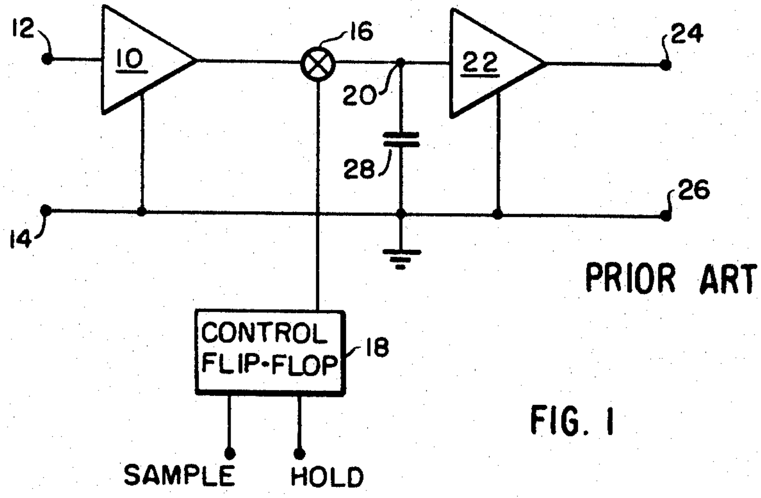
FIGURE 1 is a block and line diagram of a conventional sample and hold circuit.

In FIGURE 1, I have illustrated a conventional sample and hold circuit. As there shown, the circuit includes an input amplifier 10, having input terminals 12 and 14. The output signal of the amplifier 10 is supplied to a series switch 16 which is shown symbolically since it may be a relay contact, a transistor or diode switch or the like. In the example shown, the switch 16 is controlled by the state of a control flip-flop 18 whose state in turn is controlled by appropriate signals supplied to its "track" or "hold" terminals; these latter terminals correspond to the "reset" and "set" terminals of the flip-flop.

The terminal of the series switch not connected to amplifier 10 is connected to the input terminal 20 of an output amplifier 22 which has output terminals 24 and 26. A storage capacitor 28 is connected between terminal 20 and the reference potential for the amplifiers, here shown as ground.

In the "track" mode of operation, the switch 16 is closed and the voltage appearing across the input terminals 12 and 14 of amplifier 10 is applied to capacitor 28 and also appears as the output signal of the circuit. The amplifiers 10 and 22 are generally unity gain amplifiers having high input and low output impedance. When an appropriate signal is supplied to the flip-flop 18 to cause it to change state, the switch 16 opens. The voltage being supplied to capacitor 28 at the time the switch opens is held by the capacitor and this voltage supplies the amplifier 22 and appears as the output voltage. This output voltage will continue to be present until the charge on capacitor 28 leaks off through the input impedance of amplifier 22. In practice this impedance is very high and the time constant of discharge is therefore relatively long. However, to increase this time constant further and insure sufficient time for measurement, relatively large capacitors are sometimes used for capacitor 28.

There are several disadvantages to the known sample and hold circuits such as that shown in FIGURE 1. One of these is that any imperfections in the switch, such as contact potential, noise or the like are directly added to the signal and appear in the output signal provided by the circuit. Another disadvantage is that in the circuit of FIGURE 1, the switch may be subjected, when in the open condition, to the total range of voltage of the input signal. Thus, if the circuit is switched to the "hold" mode when the input signal is at one extreme value of its range and it thereafter swings to the other extreme value during the "hold" period, the switch must withstand the entire voltage swing. In practice, this means that the switch must be of very high quality and in consequence relatively expensive in order that it will not, for this reason, introduce errors into the signal being measured.

A further problem with the circuit of FIGURE 1 is the so-called "aperture" problem. When a signal is supplied to the switch from the flip-flop 18, the switch does not open immediately but requires a finite time to operate typically 10 to 20 microseconds. This is sometimes not fast enough for modern high speed data processing systems.

There is also a limitation on how faithfully an input signal can be tracked. Very rapid changes in the input signal cannot be followed because the condenser 28 requires a finite time to charge and discharge. Accordingly when relatively large capacitors are used to increase the permissible "hold" period, the ability to track rapidly changing input signals is reduced. As will be apparent from the following description the improved circuit of my invention either obviates or permits substantial improvements in performance of sample and hold circuits in many of the respects discussed above.

*The improved circuit of the invention*

Figure 2:
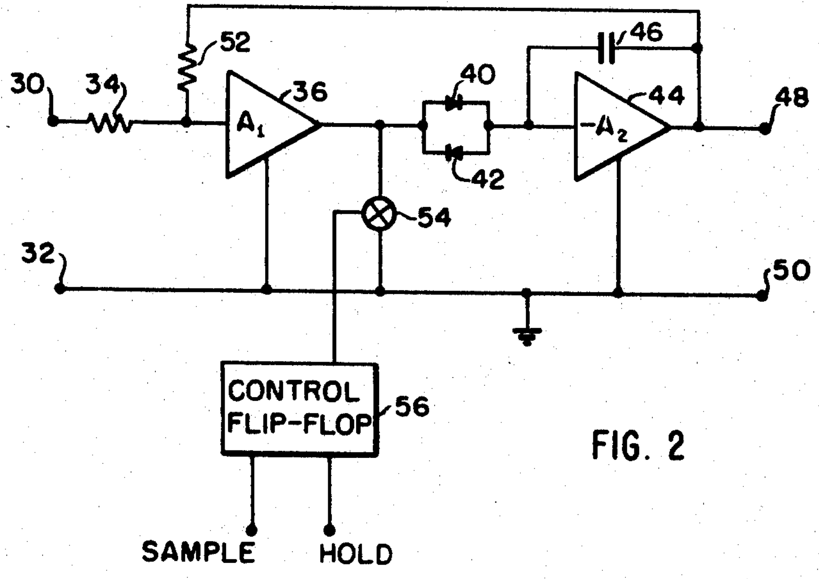
FIGURE 2 is a block and line diagram of a sample and hold circuit constructed in accordance with my invention.

An improved sample and hold circuit which incorporates my invention is illustrated in FIGURE 2 of the drawing. As shown, the circuit includes a pair of input terminals 30 and 32, one of which is connected to ground. The input signal appearing on terminal 30 is supplied through resistor 34 to amplifier 36 which may be a conventional high gain direct coupled amplifier having gain $A_1$; $A_1$ should have a value which is relatively large for reasons to be hereinafter explained. The output signal from amplifier 36 is supplied to a pair of parallel "back-to-back" diodes 40 and 42 and through the diodes to the active input terminal of a second amplifier 44. Two "back-to-back" diodes are provided so that signals of either positive or negative polarity may be conducted from the amplifier 36 to the input terminal of amplifier 44. Amplifier 44 is also a high gain, direct coupled amplifier, of the type sometimes referred to as an "operational" amplifier. As shown, a capacitor 46 is connected between the active input and output terminal of the amplifier 44. It will be noted that the gain of amplifier 44 is given as $-A_2$, the minus sign indicating an inversion or polarity reversal between input and output. A degenerative feedback path is provided from the active output terminal 48 of the amplifier 44 to the input terminal of amplifier 36 through resistor 52. The gain, $A_2$, of amplifier 44 should be fairly high i.e. of the order of $10^5$ to $10^8$.

When the product of the gains of amplifiers 36 and 44 i.e. $-A$, $A_2$ is large with respect to unity, then the total gain from input terminals 30 and 32 to output terminals 48 and 50 is determined by the ratio of resistors 52 and 34 in accordance with known principles of operation of feedback amplifiers. Where unity gain is desired, of course resistors 34 and 52 are made equal.

A switch 54 is connected between the junction of the output terminal of amplifier 36 and the diodes 40 and 42 and the reference potential here shown as ground. When the switch 54 is closed in response to a command from the control flip-flop 56, it connects this junction point to ground. In the "sample" or "track" mode of operation, this switch is open; in the "hold" mode it is closed.

In operation, when in the "track" mode, the signal applied to the input terminals 30 and 32 is amplified by amplifier $A_1$ and the amplified signal is applied, through one or the other of diodes 40 or 42 to amplifier 44 which further amplifies the signal, the amplified signal appearing between the output terminals 48 and 50. Because of the degenerative feedback around both amplifiers provided by resistor 52 and the high gain of the amplifiers 36 and 44, the output signal will be equal to the input signal multiplied by the ratio of the value of resistor 52 to resistor 34.

As noted above, amplifier 44 has very high gain. Accordingly, the input signal to amplifier 44 is very small to provide the desired output signal which is usually equal to the signal appearing across terminals 30–32 or is some relatively small multiple of the input signal, the multiple usually being 20 or less. Accordingly, amplifier 36 supplies sufficient current to amplifier 44 so that, when this current is passed through the input impedance of amplifier 44 to ground it will supply the necessary input signal. Additionally, amplifier 36 supplies current through the diodes 40 and 42 to charge the capacitor 46; the voltage level at the input terminal of amplifier 44 with respect to ground will be quite low i.e. of the order of microvolts or less for output signals of the order of volts. Accordingly, from a practical standpoint the input terminal of amplifier 44 can be considered as substantially at ground potential during operation in either the sample or hold mode.

Amplifier 44 supplies output current to the load connected across terminals 48 and 50, to the input terminal of amplifier 36 through feedback resistor 52 and also aids in charging capacitor 46 to the output potential of the circuit. Since the input terminal of amplifier 44 is virtually at ground potential, the voltage to which capacitor 46 is charged during the "sample" mode of operation will be substantially equal to the output signal appearing between terminals 48 and 50.

While the voltage at the output terminal of amplifier 36 with respect to ground during the "sample" mode will be higher than that at the input terminal of amplifier 44 it will not be the full signal voltage. Rather it will be sufficiently high to cause conduction of one or the other of the diodes 40 or 42 so that the diodes are in the low impedance region of their forward characteristic. For typical silicon or gallium arsenide diodes, the latter being the preferred type for this application, this voltage being in the range of 0.5 to 0.7 volt.

Figure 3:
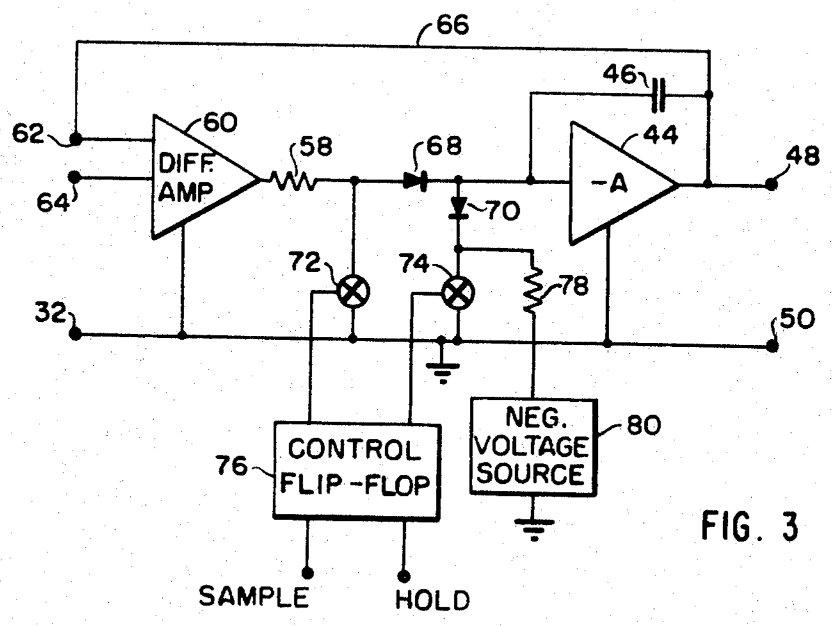
FIGURE 3 is a block and line diagram of a specific embodiment of a sample and hold circuit incorporating my invention.

The circuit of FIGURE 2 is switched from the "sample" to the "hold" mode when switch 54 is closed in response to a change in state of the control flip-flop 56. It will be observed that operation of the switch 54 grounds the output terminal of amplifier 36 and one end of each of the diodes 44 and 46 thereby opening the feedback loop. Since the output terminal of amplifier 36 is grounded, it is desirable to include a resistor in series with the output of the amplifier to prevent amplifier overload and subsequent damage and delay in recovery when the switch 54 is again opened. In FIGURE 2 this series resistor is assumed to be internal to the amplifier. In FIGURE 3, to be described below. the resistor is shown connected to the amplifier output terminal and is identified by the reference character 58.

When in the "hold" mode the amplifier 44 will maintain the voltage on capacitor 46 at the time of switching and also provide an output voltage of equal magnitude. The only leakage current which flows from capacitor 46 is that resulting from current flow through the input impedance of amplifier 44 and through the diodes 40 or 42. It will be recalled however that the input signal to the amplifier is quite small—of the order of microvolts or less. Further, even though the switch 54 is not a "perfect" switch i.e. does not connect the output to ground but presents a small impedance, the current from amplifier 36 through this small impedance will generate only a few millivolts and this is insufficient to cause conduction of the diodes in the low impedance region of their characteristics. Thus, the energy stored in the capacitor leaks off very slowly and the "hold" period may be relatively long.

In theory, the ratio of holding time $t_h$ to acquisition time[1] $t_a$ for any sample and hold circuit is given by the expression:

$$t_h/t_a=\epsilon i_c/i_L$$

where:

$\epsilon$ is the desired accuracy of the output (typically 0.1% or 0.01%)
$i_c$ is the current available to charge the capacitor and
$i_L$ is the leakage current during holding.

Using silicon diodes in the circuit of my invention, I have achieved ratios of $i_c/i_L$ of the order of $10^5$ and with gallium arsenide diodes ratios of $10^9$. This means that to hold to 0.01% accuracy, with silicon diodes, the holding period may be 10 times as long as the acquisition time and with gallium arsenide diodes $10^5$ times as long as the acquisition time. Acquisition times for the circuit of my invention range between 0.2 microsecond and 1 microsecond depending upon the size of capacitor 46. Accordingly, to hold to 0.01% accuracy with silicon diodes, holding times between 2 and 10 microseconds are possible and much longer holding times would be possible with gallium arsenide diodes. Since it is seldom required, with modern circuitry, to hold for longer than about 50 microseconds, the size of the storage capacitor 46 can be substantially reduced in circuits using gallium arsenide diodes, giving very rapid acquisition times. Indeed, I have found in circuits incorporating my invention that the principal limitation on tracking of input signals is imposed by the design of the amplifier 44 rather than by the presence of the storage capacitor.

It will also be apparent from the foregoing discussion that the requirements imposed on the switch 54 are much less stringent than those imposed on the series switch 16 in FIGURE 1. For example, there is essentially no voltage across the switch when in the open condition except for the small diode drop. The switch when closed need merely pass current. As noted above, even if the switch presents a small impedance when closed it does not appreciably affect the circuit operation. Further, the switch is incorporated as an element within the loop of a feedback amplifier. Small errors or non-linearities introduced by the switch, which appear as noise in the output are reduced, when referred to the input terminals of amplifier, by the gain of amplifier 36. For this reason, the gain of amplifier 36 should be sufficiently high to reduce the noise due to the switch in the output signal to an acceptable level. Thus the switch 54 in the circuit of my invention may be selected for optimum performance and in particular for high speed of operation under much less stringent conditions than the switch in the circuit of FIGURE 1. Further, a substantially less costly switch than that required for the circuit of FIGURE 1 will often perform adequately.

[1] Acquisition time is the time required for the storage capacitor to charge to the value of the input signal after the signal is first applied to the sample and hold circuit.

In FIGURE 3 I have illustrated another embodiment of the sample and hold circuit of my invention. The output circuit including amplifier 44 and capacitor 46 are arranged as in FIGURE 2. However, in the circuit of FIGURE 3 it is assumed that an inversion in polarity between input and output is undesirable. Accordingly, rather than providing a high gain direct coupled amplifier such as amplifier 36 in FIGURE 2, in the circuit of FIGURE 3, I provide a high gain direct coupled differential amplifier 60 having input terminals 62 and 64. The analog input signal is applied to one of these terminals 64 and the output signal is applied to the other via lead 66. Since the gain within the differential amplifier is assumed to be the same from each input, this means that the overall gain of the circuit is unity. As mentioned in connection with FIGURE 2, a resistor 58 is provided between the output terminal of amplifier 60 and the switch to limit the output current of amplifier 60 when in the "hold" condition.

In FIGURE 3 I have also illustrated an alternative to the switching arrangement shown in FIGURE 2. As there illustrated the diodes 68 and 70, which correspond to the diodes 40 and 42 in FIGURE 2 are connected in series and the input terminal of amplifier 44 is connected to the junction of the two diodes. Two switches 72 and 74 are provided, each under the control of one of the outputs of the control flip-flop 76. The cathode of diode 70 is connected through resistor 78 to a negative voltage source 80.

The switching circuit of FIGURE 3 is useful when the amplifier 60 is designed to provide a fixed or quiescent output current, signal variations appearing as variations of this output current. In the "sample" mode of operation, the current supplied by amplifier 60 flows through resistor 58 and the diodes 68 and 70 in series to the negative power supply. Increases in the value of this current above the quiescent value will charge capacitor 46 so that the left hand plate is positive with respect to the right hand plate (as seen in FIGURE 3); if current diminishes below the quiescent value, then the capacitor will be charged in the opposite direction.

In the "hold" condition, operation of the flip-flop causes switches 72 and 74 to close, thereby by-passing the current from amplifier 60 directly to ground. The circuit in the "hold" condition operates in substantially the same manner as described above in connection with FIGURE 2.

It will thus be seen that I have provided a new and improved sample and hold circuit for analog signals which because of its design imposes much less stringent requirements on the switch used to transfer from the "sample" mode to the "hold" mode of operation. This comes about because the switch is used inside the loop in a feedback amplifier and is connected in parallel with the signal path to ground rather than in series. The storage capacitor is in the feedback path around a very high gain direct coupled amplifier and the leakage path for the capacitor is through one or the other of a pair of diodes. By selection of diode types having very high impedance in the low current region of their characteristic curve very high leakage impedances result. This permits a relatively small value of storage capacitor to be selected with a consequent reduction in acquisition time.

While I have described the amplifiers in FIGURES 2 and 3 as being direct coupled amplifiers, as they will be for most applications, the circuit of my invention may also be used where the amplifiers are capacitively coupled. Then the output signal will be the value of the alternating input signal (multiplied by the overall circuit gain) at the time the switch is operated to transfer from the "sample" to the "hold" mode. When using capacitively coupled amplifiers, the holding time will be limited by the A.C. time constant of the amplifier 44.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A sample and hold circuit comprising in combination:

(1) a pair of signal input terminals,
(2) a first amplifier having at least two input terminals and a pair of output terminals,
(3) means connecting each of the input terminals of said first amplifier to a different one of said signal input terminals,
(4) a switch providing a low impedance between a pair of terminals when said switch is closed,
(5) means connecting each of said switch terminals to a different output terminal of said first amplifier,
(6) a high gain amplifier, having a pair of input and a pair of output terminals,
(7) a storage capacitor connected between one output and one input terminal of said high gain amplifier to provide a degenerative feedback path around said high gain amplifier,
(8) means including at least one diode connecting one terminal of said switch to the input terminal of said high gain amplifier to which said capacitor is connected,
(9) means connecting the other terminal of said switch to the other input terminal of said high gain amplifier,
(10) means connecting an output terminal of said high gain amplifier to an input terminal of said first amplifier to thereby provide a degenerative feedback path around both said first and said high gain amplifier,
(11) a pair of signal output terminals, and means connecting the output terminals of said high gain amplifier to said signal output terminals.

2. The combination defined in claim 1 in which said first amplifier has two input terminals, said means connecting one of said first amplifier input terminals to said signal input terminal includes a first resistor and in which said means connecting the output terminals of said high gain amplifier to the input terminals of said first amplifier includes a second resistor, the gain between said signal input terminals and the output terminals of said high gain amplifier being determined by the ratio of the value of said second resistor to said first resistor.

3. The combination defined in claim 1 in which said first amplifier is a differential amplifier having at least three input terminals, one of said three terminals being a common terminal, said common terminal and a first of said input terminals being connected to said signal input terminals, and means connecting the second input terminal and said common terminal to the output terminal of said high gain amplifier to thereby provide said degenerative feedback path.

4. The combination defined in claim 1 in which the polarity of the signal appearing across the output terminals of said high gain amplifier is inverted from the polarity of the signal appearing at its input terminals.

5. The combination defined in claim 1 in which said means connecting the terminals of said switch in parallel across the input terminals of said high gain amplifier includes a pair of back-to-back diodes connected in parallel.

6. The combination defined in claim 1 in which said first and high gain amplifiers are direct coupled amplifiers.

7. The combination defined in claim 1 in which said means connecting the terminals of said switch in parallel across the input terminals of said high gain amplifier includes a first diode, a second diode and a second switch connected in series, the series combination of said second diode and switch also being connected in parallel across the input terminals of said high gain amplifier, one terminal of said first diode and one terminal of said second diode being connected together, and one of said high gain amplifier input terminals being connected to the junction of said first and second diodes.

References Cited

UNITED STATES PATENTS

| | | | |
|---|---|---|---|
| 2,781,445 | 2/1957 | Stocker | 328—128 XR |
| 3,056,047 | 9/1962 | Cooke-Yarborough | 307—88.5 |
| 3,158,759 | 11/1964 | Jasper | 328—151 XR |
| 3,237,116 | 2/1966 | Skinner et al. | 330—9 |
| 3,304,506 | 2/1967 | Weekes | 330—100 XR |
| 3,328,705 | 6/1967 | Eubanks | 328—151 |

ROY LAKE, *Primary Examiner.*

NATHAN KAUFMAN, *Examiner.*

E. C. FOLSON, *Assistant Examiner.*